US008742948B2

(12) United States Patent
Ren

(10) Patent No.: US 8,742,948 B2
(45) Date of Patent: Jun. 3, 2014

(54) USER-MANAGED PARKING SYSTEM

(75) Inventor: Dahai Ren, Lincoln, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 203 days.

(21) Appl. No.: 13/295,531

(22) Filed: Nov. 14, 2011

(65) Prior Publication Data

US 2013/0120160 A1 May 16, 2013

(51) Int. Cl.
*G08G 1/14* (2006.01)
*B60Q 1/48* (2006.01)

(52) U.S. Cl.
USPC .... 340/932.2; 340/5.32; 340/525; 340/539.1; 340/933; 705/1.1; 705/13; 705/32; 701/202; 701/209

(58) Field of Classification Search
CPC ......... G08G 1/14; G08G 1/147; G08G 1/168; G08G 1/16; G08G 1/161; G07B 15/00; G07B 15/02; B62D 15/028; B62D 15/0275; B62D 15/0285; B62D 15/027; G06Q 30/0284
USPC ............. 340/932.2, 5.32, 5.33, 5.6, 525, 528, 340/539.1, 539.11, 933, 988; 705/1.1, 13, 705/14.37, 32, 418; 701/200, 202, 204, 209
See application file for complete search history.

(56) References Cited

U.S. PATENT DOCUMENTS 7,825,827 B2 * 11/2010 Jang et al. .................. 340/932.2
2006/0212344 A1 * 9/2006 Marcus et al. .................. 705/13
2012/0130872 A1 * 5/2012 Baughman et al. ............. 705/32

OTHER PUBLICATIONS www.gasbuddy.com/GB_Contest_Info.asptx?entry=GB, Weekly Prize Give-Away-Gasbuddy.com, Nov. 14, 2011 (Print Date), 3 pages.
www.losangelesgasprices.com/Member_Info.aspx, How It Works—Los Angeles Gas Prices, Nov. 14, 2011 (Print Date), 2 pages.
www,.losangelesgasprices.com/purchase _tickets.aspx, Purchase Prize Give-Away Tickets—Los Angeles Gas Prices, Nov. 14, 2011 (Print Date), 2 pages.

* cited by examiner

*Primary Examiner* — George Bugg
*Assistant Examiner* — Sharmin Akhter

(57) ABSTRACT

A server device may receive parking information that identifies a first plurality of parking spots, within a parking structure, that are available for parking, and a second plurality of parking spots, within the parking structure, that are unavailable for parking; store the parking information in association with information identifying the parking structure; receive, from a user device, a request for parking information associated with the parking structure; populate, in response to the request, a visual representation of the parking structure with the parking information, where the visual representation of the parking structure identifies the first plurality of parking spots and the second plurality of parking spots; and transmit the visual representation of the parking structure to the user device to assist a user, of the user device, in locating one of the first plurality of parking spots.

25 Claims, 9 Drawing Sheets

USER-MANAGED PARKING SYSTEM

BACKGROUND

Parking structures (such as parking garages, parking lots, etc.) are often vast structures with many parking spaces. A driver, who wishes to locate and park in an empty space, may spend copious amounts of time looking for an available parking space.

DETAILED DESCRIPTION OF PREFERRED EMBODIMENTS

The following detailed description refers to the accompanying drawings. The same reference numbers in different drawings may identify the same or similar elements.

Figure 1A:
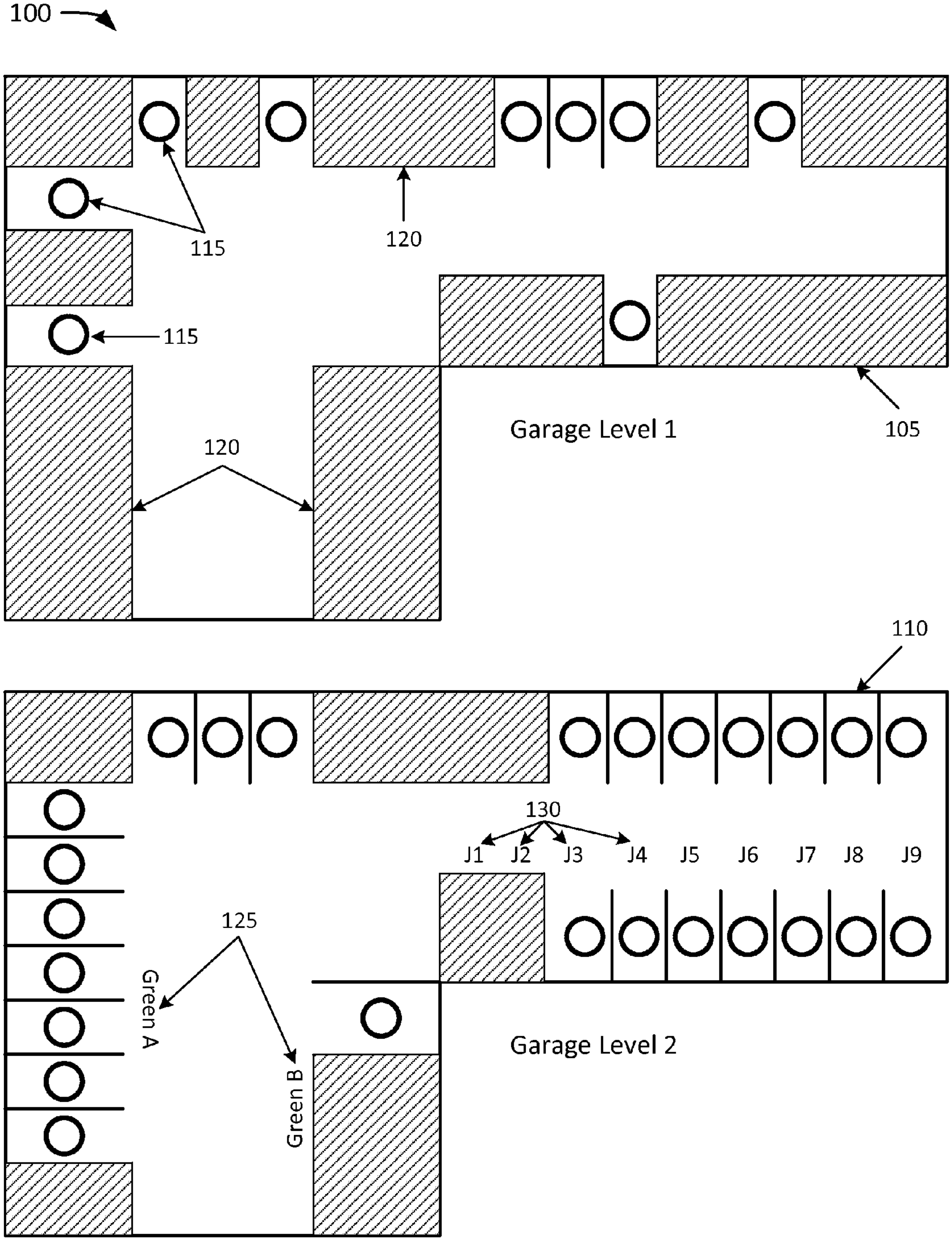
FIGS. 1A-1D illustrate an overview of an example implementation described herein.

A system and/or method, described herein, may enable users to identify available parking spots within a parking structure (such as a parking garage, a parking lot, etc.). FIGS. 1A-1D illustrates an overview of an example implementation described herein. As shown in FIG. 1A, a user interface 100 may be presented that displays available and unavailable parking spots in a parking structure. User interface 100 may be displayed by a user device (e.g., a cellular telephone, a personal digital assistant ("PDA"), a laptop computer, a global positioning ("GPS") system, or the like). User interface 100 may display information regarding multiple levels of the parking structure. For example, user interface 100 may present (e.g., display simultaneously or non-simultaneously) a representation of one level 105 of the parking structure and a representation of another level 110 of the parking structure.

User interface 100 may include visual indicators that represent available parking spots and/or unavailable parking spots. For example, in FIG. 1A, available parking spots are represented by circles 115, while unavailable parking spots are represented by dashed lines 120. Other visual indicators may be used in addition to, or in lieu of, the examples shown in FIG. 1A. For example, available parking spots may be represented by one color of shading (e.g., green), while unavailable spots may be represented by a different color (e.g., red). Additionally, or alternatively, available spots may have no visual indicator, while unavailable spots may be specifically marked (e.g., by a shape, such as a circle, shading, etc.).

Additionally, some parking structures may include identifiers that serve to identify specific spots and/or sections. As further shown in FIG. 1A, user interface 100 may include visual indicators that correspond to spots and/or sections within a parking structure. For example, user interface 100 may include identifiers 125 of sections of the parking structure (e.g., "Green A," "Green B," etc.). Additionally, or alternatively, user interface 100 may include identifiers 130 of individual spots of the parking structure (e.g., "J1," "J2," "J3," etc.)

Figure 1B:
Figure 1C:
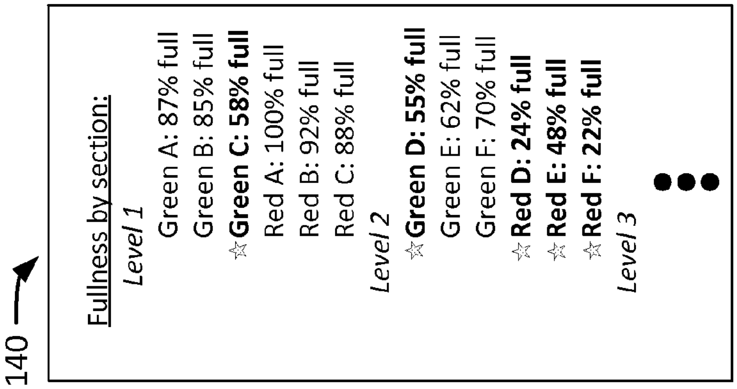
Figure 1D:
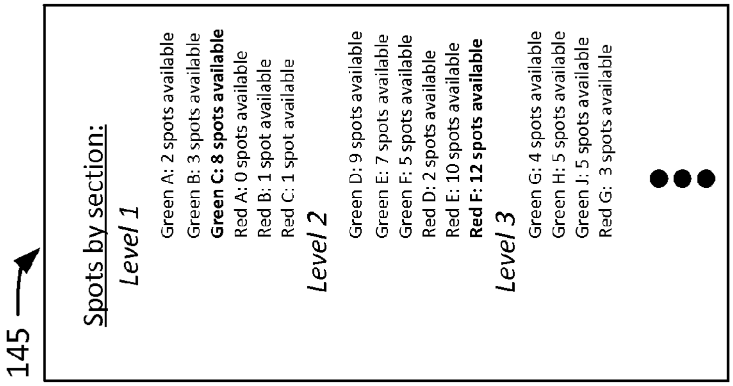

FIGS. 1B-1D illustrate additional, or alternative, user interfaces 135-145 that may be provided in order to allow users to determine where parking spots are available. For example, as shown in FIG. 1B, user interface 135 may identify individual parking spots that are available. As shown in FIG. 1B, the information provided in user interface 135 may be organized in a manner that allows a user to easily determine where parking spots are available. For instance, the information identifying available spots may be organized and/or sorted based on which level(s) the spot(s) are located. Additionally, or alternatively, the spots may be sorted in some other fashion (e.g., in alphabetical and/or numerical order, in an order that is based on distance from an entrance of the parking structure, etc.).

As shown in FIG. 1C, user interface 140 may display available parking spots, sorted by level and/or section. For example, user interface 140 illustrates that the section named "Green C" on level 1 is 58% full, that the section "Red D" on level 2 is 24% full, etc. As also shown in FIG. 1C, the information identifying one or more sections of the parking structure may be made visually more prominent than other sections (e.g., a different color, a different typeface, a different font size, bolded, italicized, underlined, etc.). Additionally, or alternatively, a visual indicator may be placed in a position associated with (e.g., a star or some other icon/image may be placed next to) information identifying one or more sections of the parking structure.

The sections, for which the corresponding information is more prominently displayed in user interface 140, may be sections that have been associated as good candidates for a user to look for a parking spot. For example, these sections may have at least a threshold percentage of available spots (i.e., a quantity of available spots in each section out of a quantity of spots that are in each section), and/or at least a threshold quantity of available spots (e.g., while the percentage of available spots is displayed, the information associated with a particular section may not be more prominently displayed unless at least a threshold quantity of spots are available in that section).

As shown in FIG. 1D, user interface 145 may display a quantity of available spots, sorted by level and by section. For example, as shown in FIG. 1D, the section titled "Green A" on level 1 may have 2 spots available, the section titled "Green B" on level 1 may have 3 spots available, etc. As in the example shown in FIG. 1C, information associated with one or more spots may be more prominently displayed than information associated with other spots. For example, information corresponding to the section that has the highest quantity of spots, per level, may be more prominently displayed. As shown in FIG. 1D, the section titled "Green C" has the highest quantity of spots available on level 1. Therefore, the information associated with the section titled "Green C" is more prominently displayed than the information associated with the other sections in level 1. Similarly, the section titled "Red F" has the highest quantity of spots available on level 2. Therefore, the information associated with the section titled "Red F" is more prominently displayed than the information associated with the other sections in level 2.

The determination of which information to display more prominently may be made by user devices, on which user interfaces 135-145 are displayed. For example, the user devices may store settings, which identify thresholds and/or preferences regarding which information to display more prominently.

Any or all of user interfaces 100, 135, 140, and/or 145 may be presented on a display of a user device, either simultaneously, or at different times. Additionally, while example user interfaces 100, 135, 140, and 145 were described above, other user interfaces that were not specifically described above may be used to present information regarding available parking spots to users.

Information displayed (e.g., some or all of information displayed on user interfaces 100, 135, 140, and/or 145) may be based on aggregated information received from user devices. For example, the example information discussed above may be provided by users, via one or more user devices, who observe parking spots that are available and/or unavailable. These users may include one or more parking structure patrons and/or an owner/operator of the parking structure. Additionally, or alternatively, some or all of the information may be collected via automated means (e.g., sensors in the parking structure, camera(s) associated with the user devices, camera(s) associated with automobiles of users of user devices, etc.).

Figure 2:
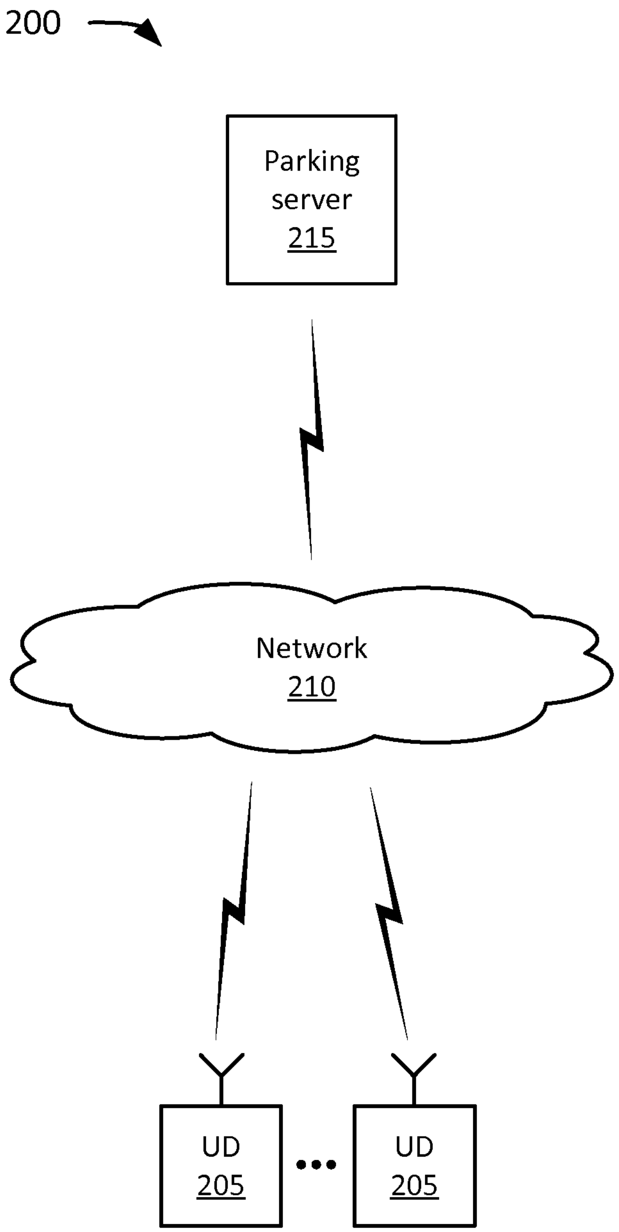
FIG. 2 is a diagram of an example system in which methods, described herein, may be implemented.

FIG. 2 depicts a diagram of an example system 200 in which systems and/or methods described herein may be implemented. As shown, system 200 may include a group of user devices 205 (referred to collectively as "user devices 205," and in some instances individually, as "user device 205"), network 210, and parking server 215. Two user devices 205, a single network 210, and a single parking server 215 have been illustrated in FIG. 2 for simplicity. In practice, additional user devices 205, networks 210, and/or parking servers 215 may be used.

User device 205 may include one or more mobile devices that are capable of sending/receiving voice and/or data. User device 205 may include, for example, a radiotelephone, a personal communications system ("PCS") terminal (e.g., a terminal that may combine a cellular radiotelephone with data processing and data communications capabilities), a PDA (e.g., a device that may include a radiotelephone, a pager, Internet/intranet access, etc.), a laptop computer, a tablet computer, a GPS device, a navigational system, etc.

Network 210 may include one or more devices that transfer/receive voice and/or data to a circuit-switched and/or packet-switched network. In one embodiment, network 210 may include, for example, a mobile switching center ("MSC"), a gateway mobile switching center ("GMSC"), a media gateway ("MGW"), a serving general packet radio service ("GPRS") support node ("SGSN"), a gateway GPRS support node ("GGSN"), and/or other network devices. Network 210 may include one or more wireless networks, such as a Long Term Evolution ("LTE") network, a CDMA2000 1× ("1×") network, a CDMA2000 Evolution-Data Optimized ("EV-DO") network, etc. Although shown as a single network, network 210 may include multiple networks, such as one or more radio access networks ("RANs"), one or more intranets, the Internet, etc.

Parking server 215 may include one or more devices that receive, store, and/or provide parking information. Parking server 215 may receive such information from, and provide such information to, one or more user devices 205 via network 210. Example functionality of parking server 215 is described further below.

Figure 3:
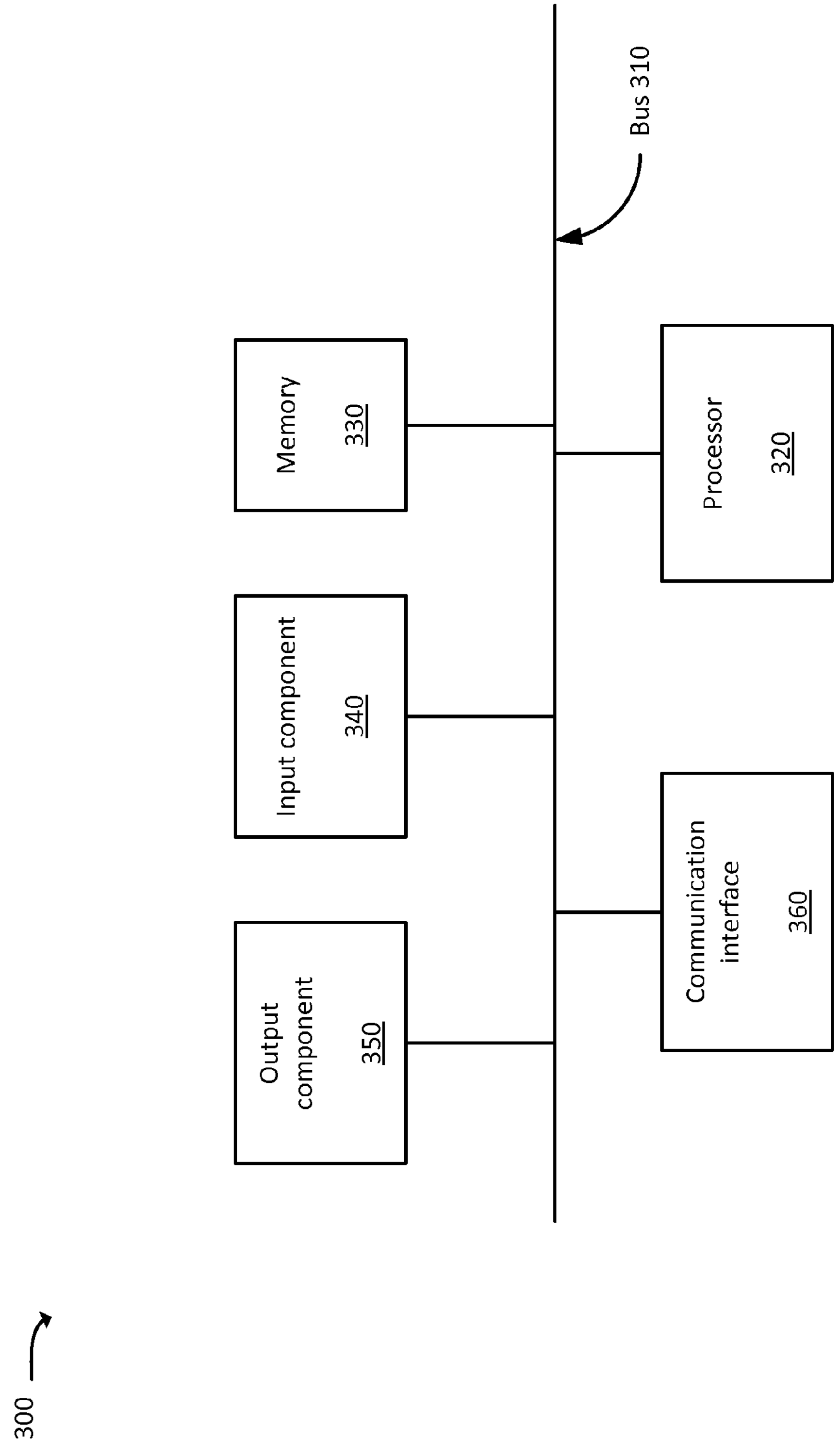
FIG. 3 is a diagram of example components of one or more devices shown in FIG. 2.

FIG. 3 is a diagram of example components of device 300. Each of the devices illustrated in FIG. 2 may include one or more devices 300. Device 300 may include bus 310, processor 320, memory 330, input component 340, output component 350, and communication interface 360. In another implementation, device 300 may include additional, fewer, different, or differently arranged components. Some non-limiting examples of device 300, with additional and/or different components, are discussed below.

Bus 310 may include one or more communication paths that permit communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits an operator to input information to device 300, such as a microphone, a keyboard, a keypad, a button, a switch, etc. Output component 350 may include a mechanism that outputs information to the operator, such as a display, a speaker, one or more light emitting diodes ("LEDs"), etc.

Communication interface 360 may include any transceiver-like mechanism that enables device 300 to communicate with other devices and/or systems. For example, communication interface 360 may include an Ethernet interface, an optical interface, a coaxial interface, or the like. Communication interface 360 may include a wireless communication device, such as an infrared ("IR") receiver, a Bluetooth radio, a GPS transceiver, or the like. The wireless communication device may be coupled to an external device, such as a remote control, a wireless keyboard, a mobile telephone, etc. In some embodiments, device 300 may include more than one communication interface 360. For instance, device 300 may include an optical interface and an Ethernet interface.

As will be described in detail below, device 300 may perform certain operations relating to providing parking information to users. Device 300 may perform these operations in response to processor 320 executing software instructions stored in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions stored in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
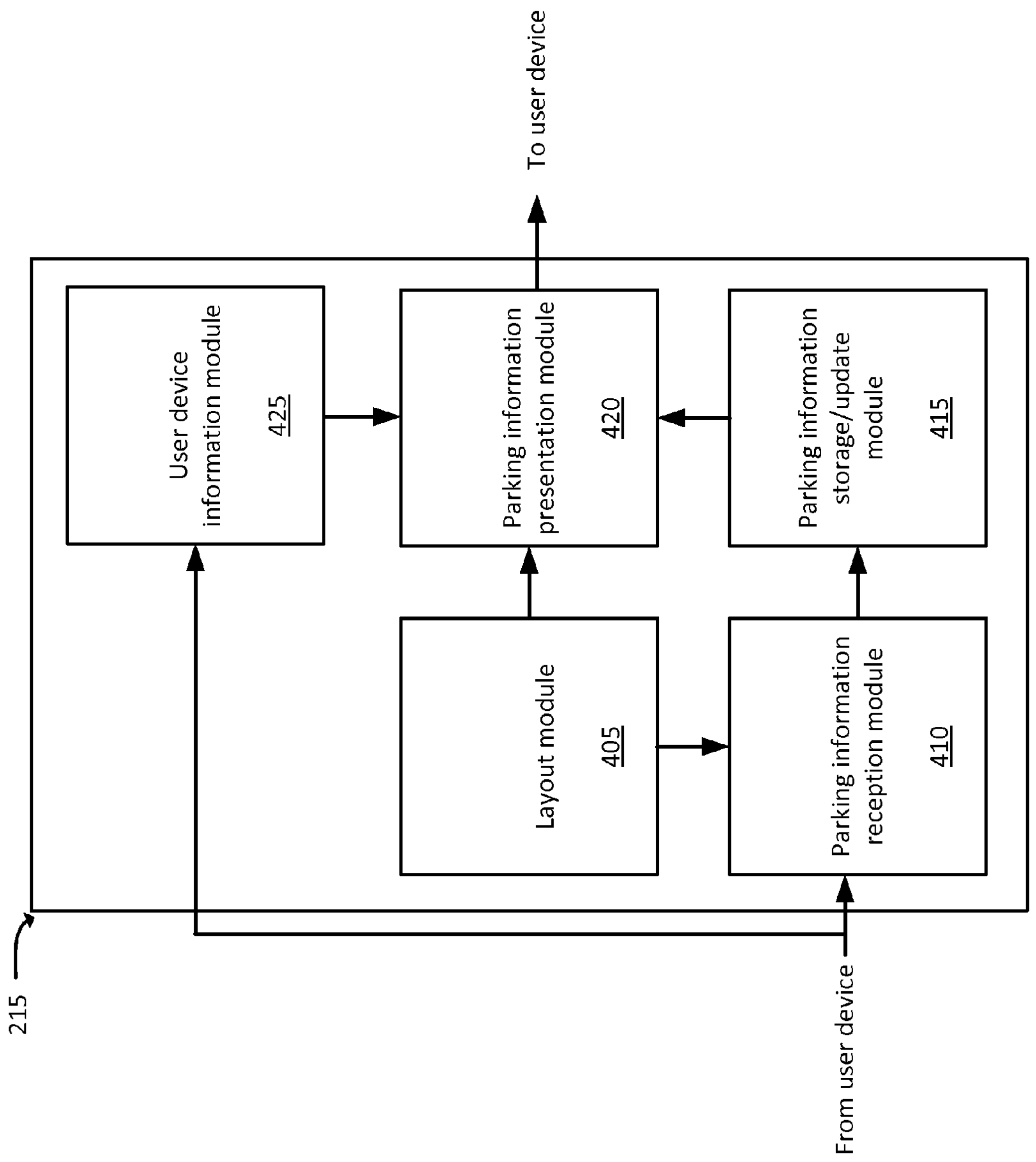
FIG. 4 is a diagram of example components of a parking server shown in FIG. 2.

FIG. 4 is a diagram of example functional components of parking server 215. As shown in FIG. 4, parking server 215 may include modules 405-425. Any, or all, of modules 405-425 may be implemented by one or more memory devices (such as memory 330) and/or one or more processors (such as processor 320). Furthermore, multiple modules may be associated with the same memory device and/or processor (e.g., one memory device, or one set of memory devices, may store information associated with two or more of modules 405-425).

Module 405 may receive and/or store layout information regarding one or more parking structures. The layout information, for a particular parking structure, may include a to-scale or a not-to-scale representation of the parking structure. For instance, the layout information may include a technical drawing and/or a blueprint. In other implementations, the layout information may not include a drawing and/or a blueprint. The layout information may include information about the parking structure, such as where parking spots are located in the parking structure, how parking spots are oriented, names/identifiers of parking spots, names/identifiers of sections of the parking structure, etc.

The layout information may include geographic coordinates associated with one or more spaces. For example, a particular space may be associated with one particular set of coordinates (or a range of sets of coordinates), while an adjacent space may be associated with another set of coordinates (or another range of sets of coordinates). The geographic coordinates may be represented as two-dimensional coordinates, and/or as three-dimensional coordinates (for instance, in a parking structure with multiple levels, two different spots may be associated with the same latitude and longitude, but two different altitudes).

Module 405 may receive the layout information from one or more devices associated with an administrator (e.g., an owner/operator of parking server 215 and/or of one or more parking structures). For example, an administrator may create a computer-assisted drawing that represents a particular parking structure. Additionally, or alternatively, module 405 may receive information that includes identifiers of individual parking spots and/or sections of the particular parking structure. Additionally, or alternatively, module 405 may receive an aerial view (e.g., an image captured by a satellite) of at least a portion of the parking structure.

Module 410 may receive parking information from one or more user devices (e.g., one or more user devices 205). The parking information may identify (or may aid in identifying) a particular parking structure in which user device 205 is located. For example, the parking information may include a specific identifier associated with the particular parking structure, and/or the parking information may include information identifying a geographic location, associated with user device 205.

The received parking information may further identify (or may aid in identifying) one or more particular parking spots that are available, and/or one or more particular parking spots that are unavailable. For instance, the received parking information may include identifiers of one or more individual parking spaces that are available and/or unavailable. As discussed above, such identifiers may include one or more names/labels of individual parking spaces. Returning to the example shown in FIG. 1A, the received parking information may include an indication that spots J1 and J2 are unavailable. Additionally, or alternatively, the received parking information may include an indication that one or more of spots J3-J9 are available. This information may be directly received from a user of user device (e.g., a user may manually identify that spots J1 and J2 are unavailable, and/or that spots J3-J9 are available, and may input these identifiers to user device 205). The information may include text (e.g., the user may have entered the information via a keyboard/keypad of user device 205) and/or voice (e.g., the user may have spoken the information via a microphone of user device 205).

Additionally, or in lieu of such identifiers, the received parking information may include one or more pictures of the parking structure. The pictures may be pictures taken by a camera associated with user device 205. For instance, user device 205 may include an integrated still picture and/or video camera, which may be used to capture an image and/or a video of the parking structure. Additionally, or alternatively, user device 205 may be communicatively coupled to a camera that is associated with an automobile associated with a user of user device 205. For example, user device 205 may communicate, via Bluetooth or some other technology, with an in-dash camera associated with the automobile.

Module 410 may analyze the received picture and/or video to identify one or more available and/or unavailable parking spots. For example, module 410 may use image recognition technology to identify available and/or unavailable parking spots. Module 410 may identify visual clues, such as landmarks that are visible in the picture and/or video (e.g., pillars, signs, floor markings, elevators, doors, etc.). Module 410 may compare these visual clues to stored information about the particular parking structure (e.g., layout information stored by module 405), to identify available and/or unavailable parking spots.

Additionally, or alternatively, the received parking information may include a geographic location of user device 205. User device 205 may identify its geographic location automatically (e.g., using GPS technology, cellular triangulation, and/or some other technique). The geographic location information may include two-dimensional geographic location information (e.g., latitude and longitude), and/or three-dimensional geographic location information (e.g., latitude, longitude, and altitude).

Module 410 may analyze the received geographic location information received from user device 205 to identify one or more available and/or unavailable parking spots. For example, module 410 may compare the received geographic location information to stored information about the particular parking structure (e.g., layout information stored by module 405), to identify available and/or unavailable parking spots.

Additionally, or alternatively, the received parking information may be received from one or more devices that are external to (e.g., not communicatively coupled with) user device 205. For instance, when a parking spot becomes unavailable (e.g., when an automobile enters a spot) and/or when a parking spot becomes available (e.g., when an automobile leaves a spot), one or more sensors, associated with the parking spot, may send information to parking server 215, identifying the particular spot.

Module 410 may calculate information regarding sections of a parking structure, based on received/calculated information regarding individual parking spaces. For example, module 410 may receive layout information from module 405 that identifies one or more sections, and one or more individual spots that are associated with the sections. Thus, module 410 may use the layout information in conjunction with the information regarding individual parking spaces to calculate availability of spots within certain sections.

Module 415 may continuously receive and store information from module 410, thereby maintaining current information regarding available and/or unavailable spots in one or more parking structures. Module 415 may also process the received information and store the processed information. For example, module 415 may receive and/or store layout information that identifies that particular spots are in a particular section (e.g., that spots J1-J10 are associated with a section named "Blue J"). Assume that module 415 receives information identifying that spots J1, J3, J7, and J8 are unavailable. Module 415 may process this information to calculate that section "Blue J" is 40% full.

Module 415 may also reset the information (e.g., may identify some or all spots associated with a particular parking garage as available, without otherwise receiving information that identifies the spots as available) stored in module 415 on a periodic basis. For example, it may be assumed that a parking structure will become full at a particular time of day (e.g., during morning hours, such as between 6:00 and 9:00

AM). Thus, module 415 may reset the stored parking information daily, at a particular time (e.g., 3:00 AM). The particular time may be configurable (e.g., by a user, such as an administrator, associated with parking server 215). The particular time may also be adjusted or generated automatically, based on usage of the parking structure (e.g., times that cars are present in the parking structure, times that cars are least likely to enter the parking structure, etc.).

Module 420 may receive a request for parking information from user device 205. For instance, a user who desires to park in a parking structure may send, via user device 205, a request to parking server 215 to provide information regarding spots that are available and/or unavailable in the parking structure. The request may include information that identifies (or may aid in identifying) a parking structure for which the user desires information. For example, the request may include an address (e.g., an address of the parking structure, or an address of a geographic location based on which the parking structure can be identified), a geographic location of user device 205, or some other identifier that identifies the parking structure.

The request may also include user device information. Module 420 may compare the received user device information with information stored by/received from module 425, in order to determine whether to provide the requested information to user device 205. For example, module 420 may determine whether user device 205 is authorized to receive the information (e.g., whether user device 205 is associated with a subscription to a service that provides parking information, whether user device 205 has provided parking information in the past, etc.). Additionally, or alternatively, module 420 may determine whether additional information is required from user device 205, based on the user device information. For instance, module 420 may determine that additional authentication information (e.g., a password, a personal identification number, etc.) and/or additional payment information is required from user device 205 before providing information to user device 205. Further still, module 420 may determine, based on user device information, whether user device 205 is entitled to any rewards, based on the user device information. For instance, module 420 may determine that user device 205 has provided at least a threshold amount of parking information, and is entitled to a reward (e.g., a cash reward, a credit toward a retail product or service, a coupon, a gift card, etc.).

In response to the request for parking information, module 420 may provide the requested information to user device 205. For example, module 420 may provide information identifying one or more available and/or unavailable spots in the parking structure to user device 205. The information may be provided by module 420 in the form of a technical drawing and/or a blueprint. Additionally, or alternatively, the information may be provided by module 420 in the form of one or more identifiers of one or more parking spots and/or sections of the parking structure. For instance, the information may identify spots by name (such as "J1," "J2," etc., referring to the example discussed above), and/or may identify sections and corresponding availability information (e.g., section "Green A is 87% full," "Green B has 3 spots available," etc. referring to the example discussed above).

In addition to the requested information, module 420 may also present and/or request additional information. For example, module 420 may prompt user device 205 for authentication information before providing the requested parking information to user device 205. Further, module 420 may provide information regarding one or more rewards earned by user device 205, progress towards earning a reward, etc.

As mentioned above, module 425 may store user device information. For instance, module 425 may store user device information that identifies whether one or more user devices 205 are associated with a subscription to a service that provides parking information. Additionally, or alternatively, module 425 may store information that identifies a quantity of parking information that has been provided by user devices 205. For example, when user device 205 sends information that identifies available and/or unavailable parking spots, module 425 may store information that identifies that user device 205 has provided such information, and may further store information that identifies how often (e.g., a quantity of reports over a period of time), or to what extent (e.g., a quantity of spots identified), user device 205 has provided such information.

Module 425 may receive user device information from one or more user devices 205, from a user (e.g., an administrator), and/or automatically from one or more devices that store and/or generate such information (e.g., a policy charging and rules function ("PCRF"), an authentication, authorization, and accounting ("AAA") server, or the like).

Although FIG. 4 shows example modules of parking server 215, in other implementations, parking server 215 may include fewer, different, or additional modules than depicted in FIG. 4. In still other implementations, one or more modules of parking server 215 may perform the tasks performed by one or more other modules of parking server 215. Furthermore, while modules 405-425 were described above as being components of parking server 215, one or more of modules 405-425 may be implemented as components of user device 205.

Figure 5:
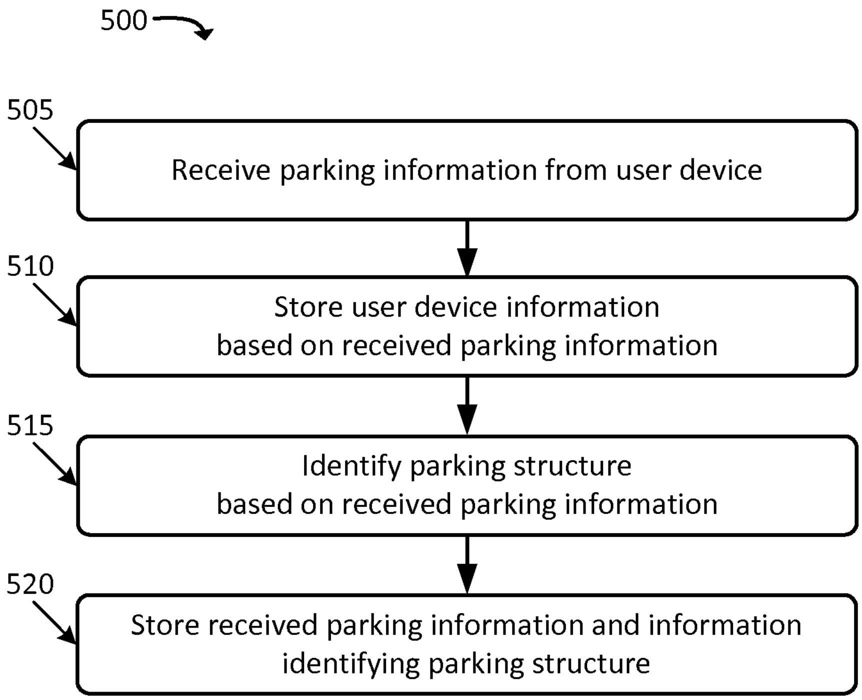
FIG. 5 is a diagram of an example process for receiving parking information from a user device.

FIG. 5 shows an example process 500 for receiving parking information from user device 205. In one example implementation, process 500 may be performed by parking server 215. In another example implementation, some or all of process 500 may be performed by a device or collection of devices separate from, or in combination with, parking server 215.

Process 500 may include receiving parking information from user device 205 (block 505). For example, parking server 215 may receive parking information from user device 205. As discussed above, the received parking information may include information that identifies (or aids in identifying) a particular parking structure with which the parking information is associated. For example, the received parking information may include a name of the parking structure, an address of the parking structure, an address of a geographic location that is associated with the parking structure (e.g., an address that is within a particular distance away from the parking structure), information identifying a two- or three-dimensional geographic location of user device 205 (e.g., as determined through GPS technology, cellular triangulation, or some other technique), or some other identifier.

As discussed above, the received parking information may also include an indication of availability of one or more parking spots associated with the particular parking structure. For example, the received parking information may include an identifier (e.g., a parking spot name and/or number) of one or more parking spots that are available and/or unavailable. Additionally, or alternatively, the received parking information may include an identifier of one or more sections, and an indication of how full the sections are (e.g., an indication that section "Red A" is 100% full/unavailable, an indication that section "Green A" has 2 spots available, etc.).

Additionally, or alternatively, the received parking information may include picture information, video information, audio information, two- or three-dimensional geographic location information (e.g., as determined through GPS technology, cellular triangulation, or some other technique), etc. As discussed above, parking server 215 may analyze such information to determine available and/or unavailable spots associated with the parking structure.

The received parking information may further include an identifier of user device 205. For example, the received parking information may include an international mobile subscriber identity ("IMSI") number, a device identifier, a telephone number, a name of a user associated with user device 205, etc.

Process 500 may further include storing user device information based on the received parking information (block 510). For example, parking server 215 may store information identifying user device 205 (e.g., IMSI number, device identifier, telephone number, etc.). Parking server 215 may also identify an amount of information provided by user device 205. For example, parking server 215 may identify a quantity of available and/or unavailable spots identified by user device 205 in the present parking information received from user device 205. Parking server 215 may also identify a quantity of available and/or unavailable spots identified by user device 205 in the past.

Parking server 215 may assign a value associated with each spot and/or section identified by parking information provided by user device 205. For example, parking server 215 may store a counter that is incremented for each spot and/or section identified by parking information provided by user device 205. Parking server 215 may assign different weights to different types of identification information provided by user device 205. For instance, parking server 215 may assign a weight of 1 to information that identifies a particular spot as available and a weight of 2 to information that identifies a particular spot as unavailable. Further, parking server 215 may assign a value to information, that identifies a quantity of spots that are available and/or unavailable in a section, based on how many spots are associated with the section. For instance, information regarding a section that is associated with a higher quantity of spots may be weighted more heavily than information regarding a section that is associated with a lower quantity of spots.

According to this example, assume that user device 205 provides information identifying 3 spots as available, and 2 spots as unavailable. Parking server may assign the information a value of 7 (i.e., 1+1+1+2+2) to the information. Further assume that user device 205 provides information identifying 4 spots in a particular section as unavailable. Parking server 215 may identify, based on layout information associated with the parking structure, that the particular section is associated with 10 spots. Parking server may assign a value (e.g., 6) based on identifying the quantity of spots identified by the information received from user device 205 and the layout information. As discussed above, this value may be used in order to track how active user device 205 is in providing parking information, and may also be used when determining whether user device 205 has earned any rewards.

Process 500 may further include identifying the particular parking structure based on the received parking information (block 515). For example, as mentioned above, the received parking information may include a name of the parking structure, an address of the parking structure, an address of a geographic location that is associated with the parking structure (e.g., an address that is within a particular distance away from the parking structure), information identifying a two- or three-dimensional geographic location of user device 205 (e.g., as determined through GPS technology, cellular triangulation, or some other technique), or some other identifier. Parking server 215 may compare the received parking information to stored information, that identifies one or more parking structures, in order to identify the parking structure to which the received parking information corresponds.

Process 500 may additionally include storing the received parking information and the information identifying the parking structure (block 520). For example, parking server 215 may store the received parking information and the information identifying the parking structure in one or more memory devices associated with parking server 215.

Figure 6:
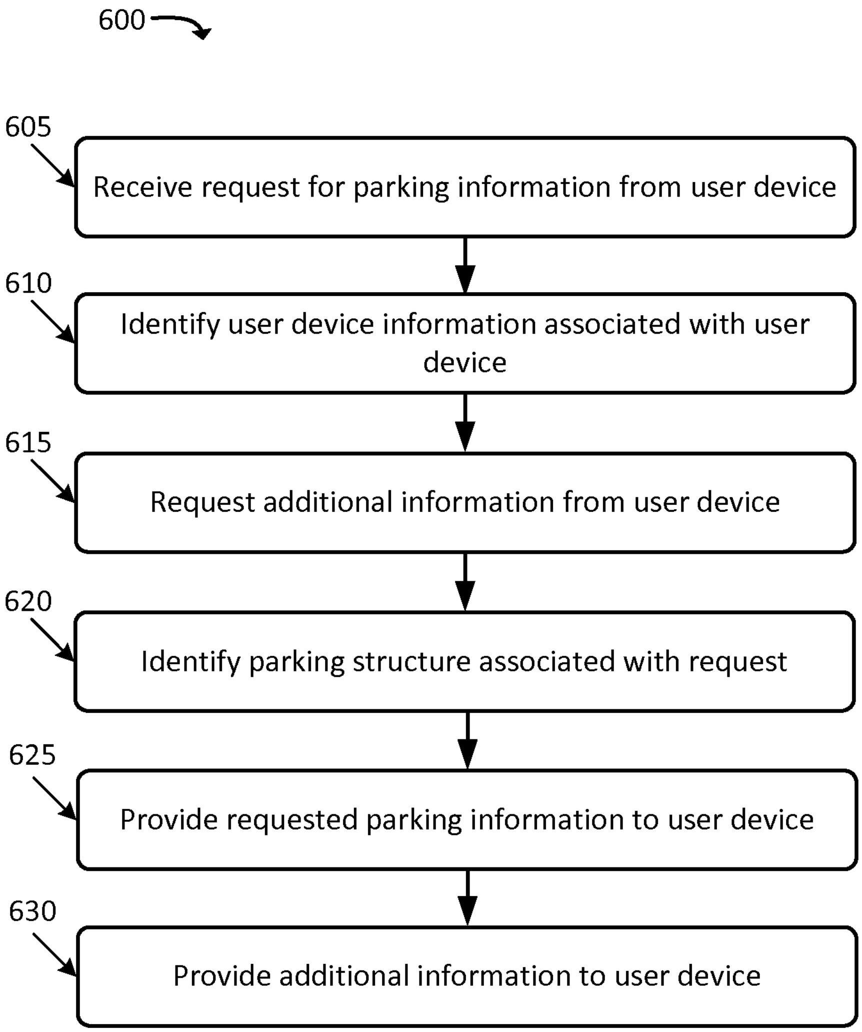
FIG. 6 is a diagram of an example process for providing parking information to a user device.

FIG. 6 shows an example process 600 for providing parking information to user device 205 in response to a request from user device 205. In one example implementation, process 600 may be performed by parking server 215. In another example implementation, some or all of process 600 may be performed by a device or collection of devices separate from, or in combination with, parking server 215.

Process 600 may include receiving a request for parking information from user device 205 (block 605). For example, parking server 215 may receive a request from user device 205, that requests parking information for a particular parking structure. The request may include information that identifies (or may aid in identifying) a parking structure for which a user of user device 205 desires information. For example, the request may include an address (e.g., an address of the parking structure, or an address of a geographic location based on which the parking structure can be identified), a geographic location of user device 205, or some other identifier that identifies the parking structure.

The received request may further include an identifier of user device 205. For example, the received parking information may include an international mobile subscriber identity ("IMSI") number, a device identifier, a telephone number, a name of a user associated with user device 205, etc.

Process 600 may further include identifying user device information associated with user device 205 (block 610). For example, parking server 215 may include identifying user device 205, based on the identifier included in the request from user device 205. Parking server 215 may determine, based on identifying user device 205, whether user device 205 is associated with any additional information (e.g., whether additional information is required from user device 205, whether user device 205 is entitled to any rewards, etc.).

Process 600 may also include requesting additional information from user device 205 (block 615). For example, parking server 215 may have determined, based on identifying user device 205 (at block 610), that additional information (e.g., authentication information, such as a password) is required from user device 205.

Process 600 may also include identifying a parking structure associated with the request (block 620). For example, parking server 215 may compare information in the request (such as an address, received at block 605) to information stored by parking server 215 that identifies one or more parking structures, in order to identify the parking structure associated with the request.

Process 600 may include providing the requested parking information to user device 205 (block 625). For example, as described above with respect to module 420, parking server 215 may provide an identifier of one or more parking spots and/or sections of the identified parking structure, and availability information regarding the parking spots and/or sections.

Process 600 may include providing additional information to user device 205 (block 630). For example, parking server 215 may provide information regarding one or more rewards earned by user device 205, progress towards earning a reward, etc.

While process 600 is described above as including blocks 605-630, process 600 may include additional, fewer, or different blocks in other examples. For instance, parking server 215 may determine (at block 610) that additional information is not required from user device 205. In such a scenario, process 600 may not include block 615 (e.g., parking server 215 may not request additional information from user device 205). Additionally, or alternatively, parking server 215 may not identify any additional information to provide to user device 205. In this scenario, process 600 may not include block 630. Further, while block 630 is discussed in the context of process 600, actions similar to block 630 may be performed at additional or different times. For example, a user may desire the additional information (e.g., the user may wish to inquire as to how often the user has contributed parking information), without requesting parking information at the same time.

Figure 7:
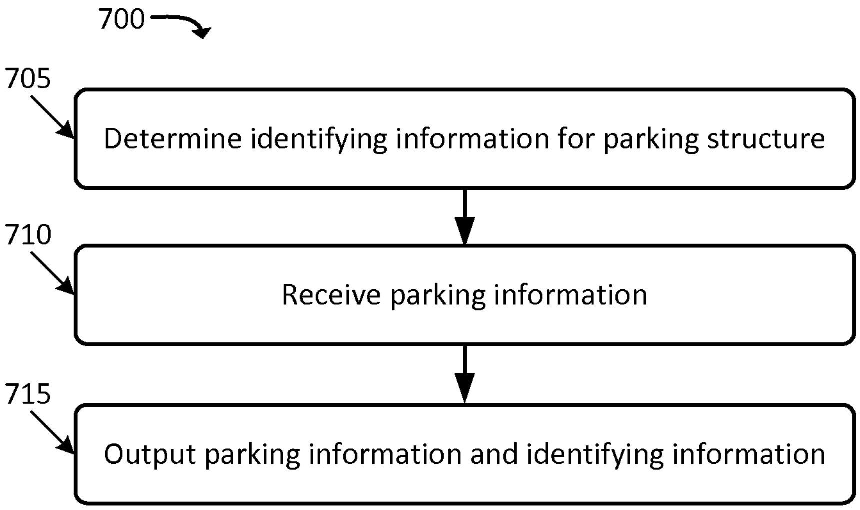
FIG. 7 is a diagram of an example process for providing parking information to a parking server.

FIG. 7 shows an example process 700 for providing parking information to parking server 215. In one example implementation, process 700 may be performed by user device 205. In another example implementation, some or all of process 700 may be performed by a device or collection of devices separate from, or in combination with, user device 205. Process 700 may be initiated in response to, for example, user device 205 receiving an indication from a user that the user desires to upload parking information.

Process 700 may include determining identifying information for a parking structure, associated with user device 205 (block 705). For example, user device 205 may determine identifying information for a particular parking structure within which, or near which, user device 205 is located. User device 205 may receive, for instance, input from a user of user device 205, which identifies the particular parking structure. The input may include voice input, typing input, etc. that identifies the particular parking structure by name, an address of the parking structure, an address within a particular distance of the parking structure, etc. Additionally, or alternatively, the input may include a selection from a list (e.g., user device 205 may present information regarding one or more candidate parking structures, and may receive a selection of one of the parking structures).

When determining the identifying information for the parking structure, user device 205 may additionally, or alternatively, determine its geographic location using GPS technology, cellular triangulation, and/or another technique. In one implementation, user device 205 may store information identifying one or more parking structures. In such an implementation, user device 205 may compare its determined geographic location to the stored information, identifying one or more parking structures, in order to determine the parking structure associated with user device 205.

Process 700 may further include receiving parking information (block 710). For example, user device 205 may receive input that identifies one or more available and/or unavailable spots. As discussed above, this parking information may include information identifying one or more spots and/or sections by name and/or number (e.g., text input, voice input, touch input, etc.), video information, audio information, geographic location information, etc.

When receiving the parking information, user device 205 may present a visual representation (e.g., a to-scale or a not-to-scale drawing or blueprint) of the parking structure with which user device 205 is associated. The visual representation may display visual representations of one or more parking spots and/or sections in the parking structure. A user of user device 205 may be able to select visual representations of one or more parking spots and/or sections in order to identify whether the parking spots and/or sections are available and/or unavailable, and/or how full sections of the parking structure are. Alternatively, in another implementation, user device 205 may not display a visual representation of the parking structure when receiving the parking information.

Additionally, or alternatively, when receiving the parking information, user device 205 may present information (e.g., a list) identifying parking spots and/or sections. User device 205 may receive selections of one or more parking spots and/or sections, as well as selections regarding availability of the one or more parking spots and/or sections.

In order to present the visual representation of the parking structure and/or the information identifying the parking spots and/or sections, user device 205 may store layout information regarding the parking structure. In one implementation, user device 205 may have previously received (e.g., before performing process 700) the layout information from one or more devices (e.g., parking server 215, or some other device). Additionally, or alternatively, user device 205 may receive the layout information after determining the identifying information for the parking structure (at block 705). In such an implementation, user device 205 may determine the identifying information, send a message, that includes the identifying information, to one or more devices (e.g., parking server 215), and receive the layout information in response to the message.

Process 700 may further include outputting the parking information and the identifying information (block 715). For example, user device 205 may output the parking information, information identifying the parking structure, and/or information identifying user device 205 (e.g., a device identifier, an IMSI number, a telephone number, etc.) to parking server 215.

Figure 8:
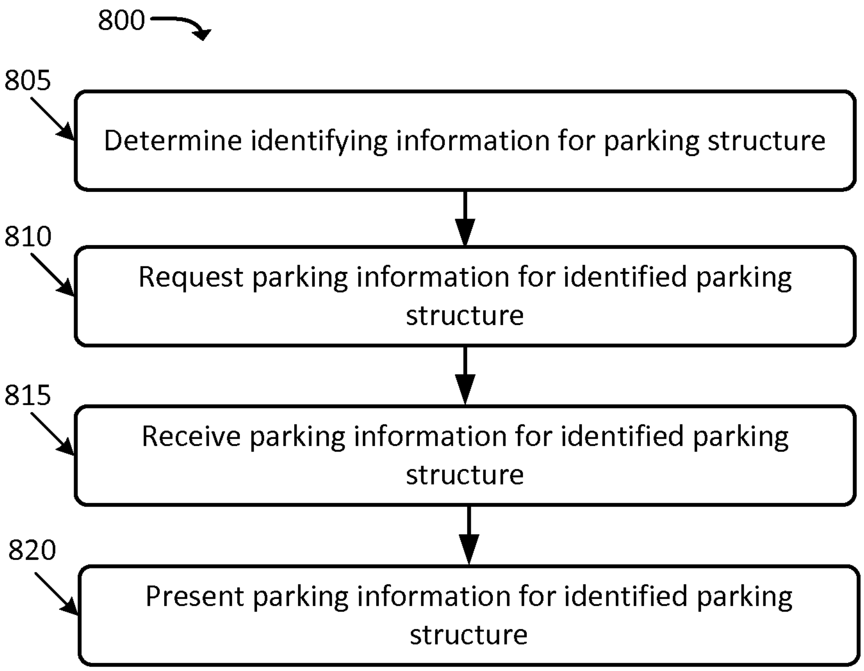
FIG. 8 is a diagram of an example process for receiving parking information from a parking server.

FIG. 8 shows an example process 800 for receiving and presenting parking information. In one example implementation, process 800 may be performed by user device 205. In another example implementation, some or all of process 800 may be performed by a device or collection of devices separate from, or in combination with, user device 205. Process 800 may be initiated in response to, for example, user device 205 receiving an indication from a user that the user desires to view parking information associated with a particular parking structure.

Process 800 may include determining identifying information for a parking structure (block 805). For example, user device 205 may receive information identifying a particular parking structure, for which parking information is desired. User device 205 may receive, for instance, input from a user of user device 205, which identifies the particular parking structure. The input may include voice input, typing input, etc. that identifies the particular parking structure by name, an address of the parking structure, an address that is within a particular distance from the parking structure, etc. Additionally, or alternatively, the input may include a selection from a list (e.g., user device 205 may present information regarding one or more candidate parking structures, and may receive a selection of one of the parking structures).

When determining the identifying information for the particular parking structure, user device 205 may additionally, or alternatively, determine its geographic location using GPS technology, cellular triangulation, and/or another technique. In one implementation, user device 205 may store information identifying one or more parking structures. In such an implementation, user device 205 may compare its determined geographic location to the stored information, identifying one or more parking structures, in order to determine the parking structure associated with user device 205.

Process 800 may further include requesting parking information for the identified parking structure (block 810). For example, user device 205 may send a request to parking server 215. The request may include the information identifying the parking structure. The request may further include information regarding user device 205 (e.g., a device identifier, an IMSI number, a telephone number, etc.). User device 205 may additionally provide other information, such as authentication information (e.g., a password).

Process 800 may further include receiving parking information for the identified parking structure (block 815). For example, user device 205 may receive parking information from parking server 215, in response to the request (sent at block 810). The received parking information may include information identifying the availability of one or more spots and/or sections associated with the parking structure. The received parking information may include a visual representation of the parking structure, such as a to-scale or a not-to-scale diagram and/or blueprint of the parking structure. The visual representation of the parking structure may include a visual representation of one or more parking spots and/or sections of the parking structure, and the availability of the one or more parking spots and/or sections of the parking structure.

Additionally, or alternatively, the received parking information may include identifiers (e.g., names and/or numbers) of one or more parking spots and/or sections, and information regarding the availability of the one or more parking spots and/or sections. In such an implementation, the received information may not include a visual representation of the parking structure.

When receiving information about a section of a parking structure, user device 205 may receive raw data (e.g., a quantity of spots that are available in a section, a quantity of spots that are unavailable in a section, and/or a total quantity of spots associated with a section), and calculate values based on the raw data. For example, user device 205 may calculate a percentage of available spots in a given section. Additionally, or alternatively, user device 205 may assign a score to a section based on the raw data. User device 205 may use the calculated values (e.g., percentages, scores, etc.) to determine whether information regarding a particular section should be displayed more prominently. Additionally, or alternatively, user device 205 may receive these calculated values (e.g., percentages, scores, etc.) and/or instructions to display information associated with one or more sections more prominently from parking server 215.

Process 800 may additionally include presenting parking information for the identified parking structure (block 820). For example, user device 205 may display one or more user interfaces (e.g., one or more of user interfaces 100, 135, 140, or 145). User device 205 may further present additional information. For example, user device 205 may present information identifying how active user device 205 has been in providing parking information (e.g., based on history data received from, and/or stored by, user device 205). User device 205 may also present information regarding a reward earned by a user of user device 205, based on the user's activity in providing parking information.

The device(s) and processes described above allow users to upload and view information regarding the availability of parking in parking structures. Additionally, in one implementation, users' upload activity is tracked, and users may be rewarded for providing information frequently (e.g., the users may be provided a gift card, a discount and/or credit toward retail products and/or services, etc.), while the users may be punished for not providing information frequently (e.g., the users may not be able to view parking information, the users may be charged a fee to view parking information, etc.).

The foregoing description of implementations provides illustration and description, but is not intended to be exhaustive or to limit the possible implementations to the precise form disclosed. Modifications and variations are possible in light of the above teachings or may be acquired from practice of the implementations. For example, while series of blocks have been described with regard to FIGS. 5-8, the order of the blocks may be modified in other implementations. Further, non-dependent blocks may be performed in parallel. It will be apparent that embodiments, as described above, may be implemented in many different forms of software, firmware, and hardware in the implementations illustrated in the figures.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:

receiving, by one or more server devices, parking information that identifies:

a first plurality of parking spots, within a parking structure, that are available for parking, and a second plurality of parking spots, within the parking structure, that are unavailable for parking, where at least some of the parking information is received from a particular user;

storing, in a memory associated with the one or more server devices, the parking information in association with information identifying the parking structure;

receiving, by the one or more server devices and from a user device, a request for parking information associated with the parking structure;

populating, by the one or more server devices and in response to the request, a visual representation of the parking structure with the parking information, where the visual representation of the parking structure identifies the first plurality of parking spots and the second plurality of parking spots;

transmitting, by the one or more server devices, the visual representation of the parking structure to the user device to assist a user, of the user device, in locating one of the first plurality of parking spots;

tracking an amount of parking information received from the particular user; and tracking progress toward a reward, associated with the particular user, based on the amount of parking information received from the particular user, where tracking the progress includes:

tracking weight values associated with the parking information received from the particular user, where information regarding a first parking spot, that is available for parking, is associated with a first weight value, and where information regarding a second parking spot, that is unavailable for parking, is associated with a second weight value.

2. The method of claim 1, where the parking information is received from a plurality of user devices over a period of time.

3. The method of claim 1, further comprising:

automatically overwriting, at a particular time, the parking information with new parking information, where the new parking information identifies one or more parking spots, of the second plurality of parking spots, as available for parking.

4. The method of claim 1, further comprising:

receiving information that a particular parking spot, of the first plurality of parking spots, is unavailable for parking; and updating the parking information to identify that the particular parking spot is unavailable for parking based on receiving the information that the particular parking spot is unavailable for parking.

5. The method of claim 1, further comprising:

calculating a statistic based on a first quantity of parking spots in the first plurality of parking spots and a second quantity of parking spots in the second plurality of parking spots; and transmitting information identifying the statistic to the user device.

6. The method of claim 1, where the parking information further includes information identifying a floor, of the parking structure, on which one or more of the first or second plurality of parking spots, within the parking structure, are located.

7. The method of claim 1, where the parking information further includes information identifying a section, of the parking structure, in which one or more of the first or second plurality of parking spots, within the parking structure, are located.

8. The method of claim 1, further comprising:

receiving at least one of picture information or video information;

performing at least one of image or video recognition on the at least one of the picture information or the video information to determine one or more landmarks;

comparing the one or more landmarks to stored information regarding the parking structure;

identifying one or more parking spots based on the comparing; and generating at least some of the parking information by identifying an availability of the one or more identified parking spots within first parking structure.

9. The method of claim 1, where the parking structure is a particular parking structure, the method further comprising:

receiving geographic location information;

comparing the received geographic location information to stored information regarding one or more geographic locations associated with one or more parking structures, including the particular parking structure; and identifying the particular parking structure based on the comparing, where storing the parking information includes:

storing an indication that the parking information is associated with the particular parking structure.

10. A system, comprising:

one or more memory devices to store a plurality of computer-executable instructions; and one or more processors to execute the instructions, to:

receive parking information that identifies:

a first plurality of parking spots, within a parking structure, that are available for parking, and a second plurality of parking spots, within the parking structure, that are unavailable for parking, where at least some of the parking information is received from a particular user;

store, in the one or more memory devices, the parking information in association with information identifying the parking structure;

receive, from a user device, a request for parking information associated with the parking structure;

populate, in response to the request, a visual representation of the parking structure with the parking information, where the visual representation of the parking structure identifies the first plurality of parking spots and the second plurality of parking spots;

transmit the visual representation of the parking structure to the user device to assist a user, of the user device, in locating one of the first plurality of parking spots;

track an amount of parking information received from the particular user; and track progress toward a reward, associated with the particular user, based on the amount of parking information received from the particular user, where executing the instructions to track the progress cause the one or more processors to:

track weight values associated with the parking information received from the particular user, where information regarding a first parking spot, that is available for parking, is associated with a first weight value, and where information regarding a second parking spot, that is unavailable for parking, is associated with a second weight value.

11. The system of claim 10, where the parking information is received from a plurality of user devices over a period of time.

12. The system of claim 10, where the one or more processors are further to:

automatically overwrite, at a particular time, the parking information with new parking information, where the new parking information identifies one or more parking spots, of the second plurality of parking spots, as available for parking.

13. The system of claim 10, where the one or more processors are further to:

receive information that a particular parking spot, of the first plurality of parking spots, is unavailable for parking; and update the parking information to identify that the particular parking spot is unavailable for parking based on receiving the information that the particular parking spot is unavailable for parking.

14. The system of claim 10, where the one or more processors are further to:

calculate a statistic based on a first quantity of parking spots in the first plurality of parking spots and a second quantity of parking spots in the second plurality of parking spots; and transmit information identifying the statistic to the user device.

15. The system of claim 10, where the parking information further includes information identifying a floor, of the parking structure, on which one or more of the first or second plurality of parking spots, within the parking structure, are located.

16. The system of claim 10, where the parking information further includes information identifying a section, of the parking structure, in which one or more of the first or second plurality of parking spots, within the parking structure, are located.

17. The system of claim 10, where the one or more processors are further to:

receive least one of picture information or video information;

perform at least one of image or video recognition on the at least one of the picture information or the video information to determine one or more landmarks;

compare the one or more landmarks to stored information regarding the parking structure;

identify one or more parking spots based on the comparing; and generate at least some of the parking information by identifying an availability of the one or more identified parking spots within the parking structure.

18. The system of claim 10, where the parking structure is a particular parking structure, where the one or more processors are further to:

receive geographic location information;

compare the received geographic location information to stored information regarding one or more geographic locations associated with one or more parking structures, including the particular parking structure; and identify the particular parking structure based on the comparing, where when storing the parking information, the one or more processors are to:

store an indication that the parking information is associated with the particular parking structure.

19. A computer-readable medium, comprising:

one or more computer-executable instructions, which, when executed by one or more processors, cause the one or more processors to:

receive parking information from a plurality of user devices, the parking information identifying:

a first plurality of parking spots, within a parking structure, that are available for parking, and a second plurality of parking spots, within the parking structure, that are unavailable for parking, where at least some of the parking information is received from a particular user;

store the parking information in association with information identifying the parking structure;

receive, from a user device, a request for parking information associated with the parking structure;

generate, in response to the request, information regarding the parking structure based on the parking information, where the information regarding the parking structure identifies the first plurality of parking spots and the second plurality of parking spots;

transmit the information regarding the parking structure to the user device to assist a user, of the user device, in locating one of the first plurality of parking spots, track an amount of parking information received from the particular user; and track progress toward a reward, associated with the particular user, based on the amount of parking information received from the particular user, where executing the instructions to track the progress cause the one or more processors to:

track weight values associated with the parking information received from the particular user, where information regarding a first parking spot, that is available for parking, is associated with a first weight value, and where information regarding a second parking spot, that is unavailable for parking, is associated with a second weight value.

20. The computer-readable medium of claim 19, where the computer-executable instructions further cause the one or more processors to:

automatically overwrite, at a particular time, the parking information with new parking information, where the new parking information identifies one or more parking spots, of the second plurality of parking spots, as available for parking.

21. The method of claim 1, further comprising:

receiving information regarding a layout of the parking structure, the layout information including at least one of:

information regarding locations of the parking spots in the parking structure, information regarding orientations of the parking spots in the parking structure, or names or identifiers of the parking spots in the parking structure;

where the visual representation of the parking structure includes visual representations of the parking spots in the parking structure, the visual representations of the parking spots being based on the layout information, and where populating the visual representation of the parking structure includes:

using a first type of visual indication for visual representations of the first plurality of parking spots, and using a second type of visual indication for visual representations of the second plurality of parking spots, where the first visual indication includes at least one of a first color of shading or a first type of marking and the second visual indication includes at least one of a different second color of shading or a different second type of marking, each of first and second types of marking including at least one of a shape or a shading pattern.

22. The method of claim 21, where the layout information specifies a physical layout of the parking structure, the physical layout including at least one of walls or driving lanes of the parking structure.

23. The method of claim 5, where the statistic indicates a proportion of at least one of available parking spots or unavailable parking spots in the parking structure.

24. The method of claim 1, where the first weight value is different from the second weight value.

25. The method of claim 1, where at least one of the first weight value or the second weight value are based on a quantity of parking spots in a particular section of the parking structure, the particular section comprising at least one of the first parking spot or the second parking spot.

* * * * *